United States Patent Office 2,970,430
Patented Feb. 7, 1961

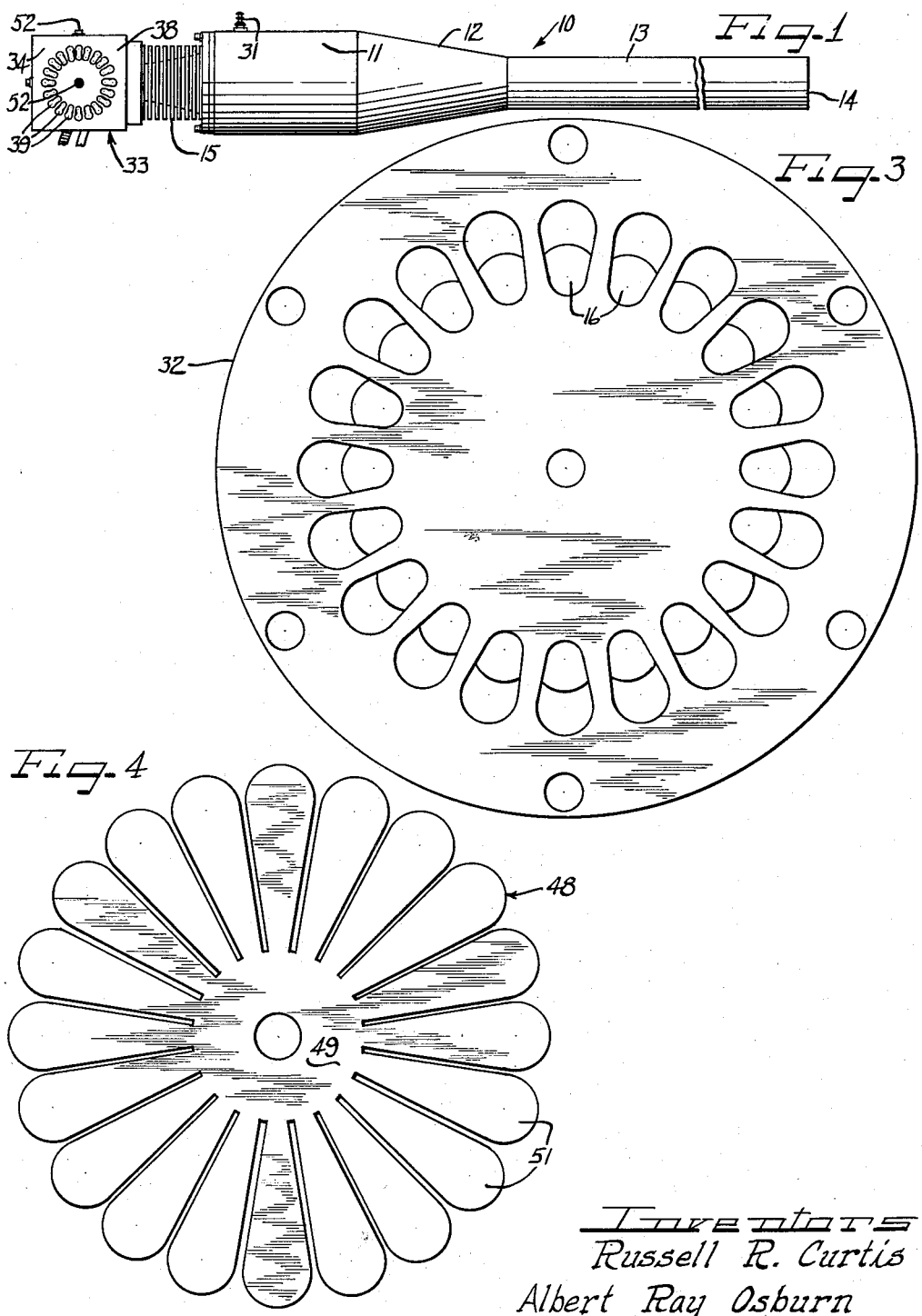

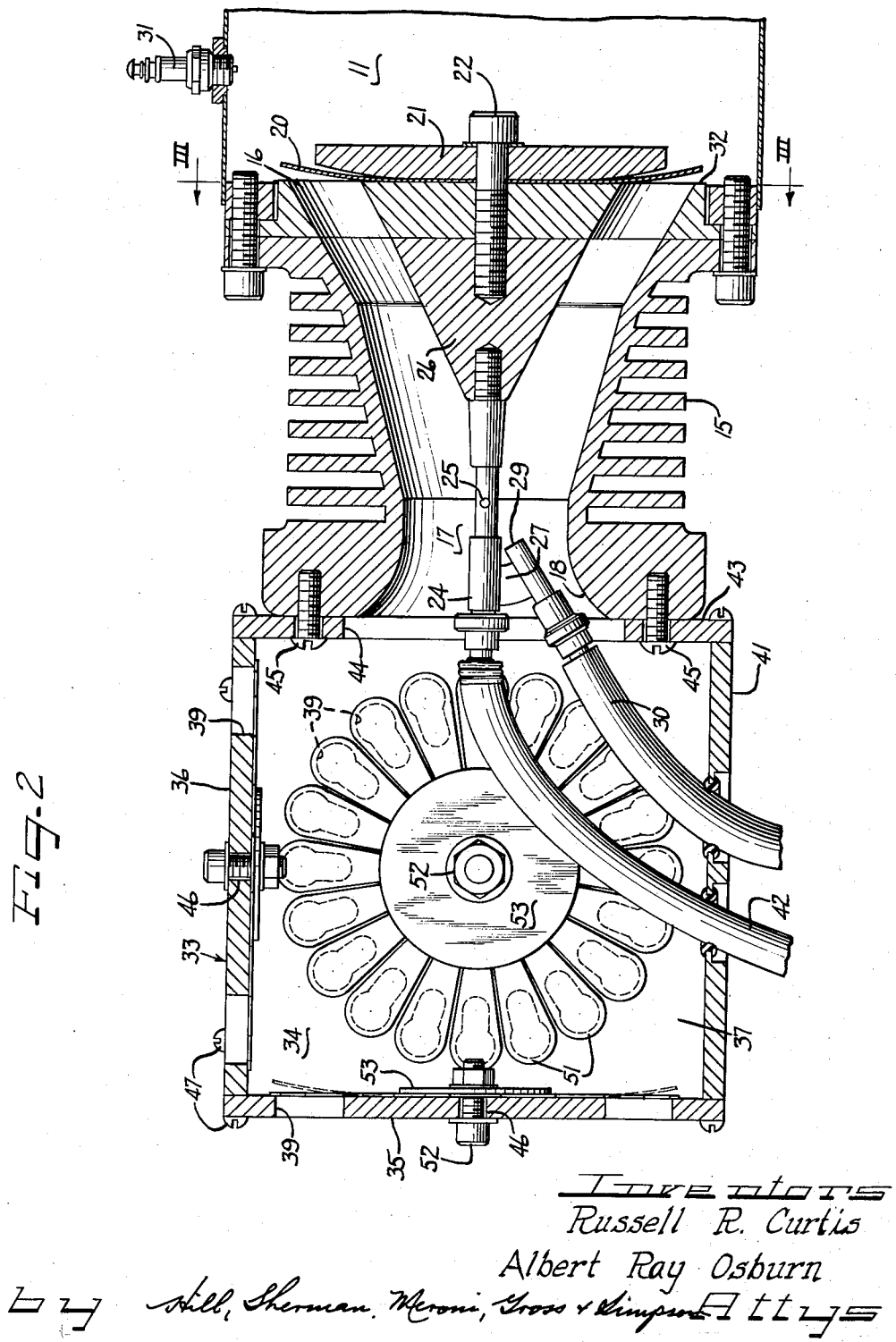

2,970,430
AUXILIARY INLET VALVE FOR RESONANT PULSE JET ENGINES

Russell R. Curtis and Albert Ray Osburn, Bedford, Ind., assignors to Curtis Automotive Devices, Inc., Bedford, Ind., a corporation of Ohio Filed Mar. 4, 1958, Ser. No. 719,090

4 Claims. (Cl. 60—35.6)

This invention relates to pulse jet engines and more particularly to an inlet valve assembly at the entrance of a fuel and air mixing compartment of a pulse jet engine.

Heretofore, prior art pulse jet engines required for satisfactory starting relatively substantial amounts of starting air at relatively high pressures furnished, for example, by a compressor or a pump or had to be provided with easy-acting valves or valves which do not completely close. Such pulse jet engines are subject, especially during starting, to "blow-back" of fuel spray resulting from the reverse passage of gases from the combustion chamber through the principal valve during the pressure portion of the cycle when the valve is in the act of closing thereby resulting in a decrease in the overall efficiency of the engine and a substantial fire hazard. Such engines also have the undesirable characteristic of emitting high level and painful noises from the inlet end of the engine. The hazard of fire during operation of resonant pulse jet engines is quite severe and may occur as the result of a broken or weak principal valve or as a result of the principal valve being momentarily held open during starting by the moving combustible stream of fuel and air, the flame resulting from the ignition of the mixture in the combustion chamber progressing very rapidly in the reverse direction past the principal valve when it is open or in a partially open position. This condition is particularly severe in larger engines which are started with limited amounts of air, such as by means of a hand pump or the like, or when a free-acting principal valve is used or when the valve in its relaxed or unstressed condition does not fully close. Such valves minimize restriction of passage of the fuel-air mixture into the combustion chamber and are used in pulse jet engines designed for spraying, producing fog or the like. Starting of the engine is facilitated because of the reduced air-fuel restriction, and also a pressure build-up is developed which forces the starting air through the principal valve.

In preferred engines of this invention fuel is supplied to a venturi inlet throat from a fuel nozzle in the throat. Air from a compressor, hand pump or the like is discharged through a nozzle outlet also positioned in the throat to form a fuel-air mixture for feeding through the principal valve into the combustion chamber. Once the engine is started, air to form the fuel-air mixture is supplied through the inlet valve device of this invention. This device accommodates a free flow of air into the throat but stops reverse flow of air from the throat back to the surrounding atmosphere.

It is, therefore, a principal object of the present invention to provide an inlet valve device for resonant pulse jet engines that allows the engine to be designed with low air flow restriction and have less total air flow restriction than conventional pulse jet engines.

It is another object of the present invention to provide an inlet valve assembly for resonant pulse jet engines that permits the use of large ports, a principal valve of greatly reduced restriction and increased flexibility and the like designs, thereby greatly reducing the resistance to air flow into the engine combustion chamber and allowing the engine to consume fuel at a greater rate and thus produce more power, with no increase in engine size.

A further object of the present invention is the provision of an inlet valve assembly that substantially eliminates "blow-back" out of the engine into the surrounding atmosphere and the inherent loss of efficiency and fire hazard resulting therefrom.

A still further object of the present invention is the provision of an inlet valve assembly that facilitates starting of pulse jet engines. Another and a specific object is to provide an inlet valve for a pulse jet engine which acts as a muffler.

These and other objects and features of the invention, together with their incident advantages, will be more readily understood and appreciated from the following detailed description of a preferred embodiment thereof selected for purposes of illustration and shown in the accompanying drawings, in which:

Fig. 1 is a side elevational view showing the invention mounted at the air inlet opening of a pulse jet engine.

Fig. 2 is a fragmentary cross-sectional view of the air inlet valve assembly, fuel and air mixing compartment, and a portion of the combustion chamber.

Fig. 3 is a sectional view taken along the lines 3—3 of Fig. 2.

Fig. 4 is a side elevational view of the valve member forming a part of the inlet valve assembly.

The present invention contemplates an inlet valve assembly forming a chamber sealably closing the air inlet opening of a pulse jet engine of any size and provided with a plurality of air inlet ports normally sealed by a valve member and cooperating support means to maintain the air inlet ports closed when the pressure within the chamber is substantially equal to or greater than the pressure exterior of the chamber and movable to open the inlet ports to admit air to start or maintain operation of the jet engine upon reduction of pressure within the chamber due to operation of the engine.

The present invention may be used with jet units, of equal or greater size, of the type shown and described in Patent No. 2,609,660 issued September 9, 1952, to William L. Tenney and Charles B. Marks.

Referring now to Fig. 1 and Fig. 2, the construction and operation of a jet unit 10 of the type referred to hereinabove, briefly, is comprised of a combustion chamber 11 which is connected by a converging section 12 to a jet pipe 13 which terminates in an orifice 14. The front of the combustion chamber is closed by a combined air intake and valve assembly generally designated 15. A valve seat plate 32 is bolted on the end of the assembly 15 and becomes part of the assembly. The plate 32 has a plurality of intake ports 16 which are connected by an annular intake passage that converges to form a venturi section 17 which has a forwardly flared air intake mouth 18. The ports 16 are covered by a valve 20 of petal configuration, one valve petal or flapper being over each of the valve ports 16. The valve 20 is held in place by a curved backstop 21 which is in turn fastened tightly by a cap screw 22 so as thus to hold the valve 20 in place. Extending through the venturi section 17 is a fuel pipe 24 which terminates in one or more fuel orifices 25. The fuel pipe is screwed into the apex of a conical central part 26 of the base of which is bolted to the plate 32 by the screw 22 and hence is held in a fixed position centrally of the venturi section 17. The fuel pipe is provided with a gusset 27 which supports the pipe 29 to which a hose 30 is attached for introducing air under pressure into the venturi section 17 for starting. A source of air pressure (not shown) causes air to pass over the holes 25 in the fuel pipe 24 thereby drawing fuel from a fuel supply tank (not shown) and ejecting it from the holes 25 in a spray.

The now mixed air and fuel continue through the air intake and valve assembly to the valve 20. As shown, the petals of the valve 20 in their free, unstressed position do not necessarily engage the seat 32, and the air-fuel mixture can pass freely through the ports 16 to enter the combustion chamber 11 where it is ignited by a spark plug 31. As combustion starts the valve petals or flaps close against the seat 32 of the assembly due to their own resiliency and also due to the force of the explosion. Thereafter, the jet unit is supplied with an air-fuel mixture created from air fed by the air inlet box or device 33 and fuel from the holes 25. The engine then operates with a self-induced resonant pulsing action, the combustion chamber 11 and the exhaust tube 13 which opens directly and freely thereinto forming parts of a system in which a prapidly occurring reversal of flow of gases takes place, causing periodic drawing in and combustion of fresh charges of fuel and air through the venturi inlet 17 and valve 20. This produces discharge of a high velocity flow of hot gases in the form of a jet from the open end 14 of the discharge tube.

With particular reference now to Fig. 2, the air inlet valve assembly 33 is shown as comprising a box 34 having four flat walls 35—36—37—38 provided with air inlet ports 39 as described more thoroughly hereinafter, a bottom wall 41 for sealably receiving fuel and air hoses 42—30, and a rear wall 43 having an opening 44 at least as large as the forward diameter of the venturi section and attached thereto as by screws 45 or the like.

Air inlet ports 39 of any suitable configuration such as for example in the form of a keyhole and of sufficient total area as to present little or no restriction to the intake of sufficient air during operation of the engine are concentrically formed about a central bolt hole 46 in the aforementioned four walls 35—36—37—38 as best shown in Fig. 1. The walls form a chamber and may be comprised of any suitable material of sufficient strength and may be assembled by means of screws 47, welding or the like to form a substantially flame or air tight enclosure. A resilient valve member 48 having a central disc portion 49 and radially extending individual outer portions 51 of petal-like configuration adapted to overlay and cover the inlet ports 39 is held in abutting engagement with the inner surface of the walls 35—36—37—38 by means of a bolt 52 passed through hole 46 and a flat back-stop disc 53 slightly greater in diameter than the central portion 49 of the valve member itself. Subject to the limitation that air flow through the ports 39 must not be substantially restricted, the back-stop 53 may be larger than the central disc portion 49 and shaped to restrict petal rise to avoid breakage of the petals.

For engines of substantial size the principal valve member 20 may be made of blue tempered spring steel stock .014 inch thick and the valve member 48 in the air inlet assembly 33 may be made of blue tempered spring steel stock .008 inch thick.

When the engine is operating the periodic partial vacuum formed in the combustion chamber opens the principal valve 20 beyond its free, unstressed position and draws air and fuel from the chamber and the air and fuel mixing compartment. The resulting partial vacuum in the chamber causes the air pressure exterior of the chamber to open the air inlet ports 39 by forcing the outer portions 51 of the valve member 48 inwardly thereby resulting in the provision of sufficient air to maintain desired operation of the engine. Blow-back past the principal valve 20 and combustion in the air and fuel mixing compartment is substantially if not completely prevented due to the fact that the increased pressure in the chamber effectively seals the air inlet valve assembly even if the petals of the valve member 20 are weak or if they do not seat due to design, extended use, improper construction and the like.

During normal operation of the engine, the air inlet valve petals 51 may vibrate in open positions away from their seats because they have lower vibrating and resonant frequency than the valve 20 and the resonant frequency of the engine itself. This further minimizes air inlet restriction and prevents a build-up of pressure to interfere with efficient engine operation.

It may now be obvious that a multiplicity of air inlet ports 39 and valve members 48 as described hereinabove of suitable material and a higher degree of resiliency than that of the principal valve 20 results in a unitary air inlet valve assembly having a restriction to air flow very much less than that of prior art principal valves per se.

Since the air inlet valve assembly on starting forms a closed chamber with the venturi, escape of starting air to the atmosphere from the starting air nozzle 29 is prevented, and all of the starting air and fuel are fed to the combustion chamber. This arrangement allows the use of large ports 16 and a principal valve which is partly open in its unstressed condition or which is relatively weak and free-acting. Reverse passage of gases from the combustion chamber out of the engine as is inherent with prior art engines cannot occur. Further, the provision of a closed chamber as described hereinabove results in the immediate extinction of any flame-back and thereby removes the principal objection to partly opened or free-acting valves. Starting of pulse jet engines is facilitated, and fire hazards are minimized. Still further, the inlet chamber provides a muffler which deadens and absorbs the high level and undesirable noise inherent with the operation of jet engines.

While the present invention has been described in its preferred embodiment, it is realized that modifications may be made, and it is desired that it be understood that no limitations on the invention are intended other than may be imposed by the scope of the appended claims.

Having now disclosed our invention, what we claim as new and desire to secure by Letters Patent of the United States is:

1. In a pulse jet apparatus, means defining a combustion chamber, a housing having a plurality of air inlet ports, a fuel and air mixing chamber joining said housing and said combustion chamber, a pulse valve between said mixing chamber and said combustion chamber, resilient one-way air inlet valves overlying said ports for admitting air to said housing, and means for feeding fuel to said mixing chamber for mixing with air from said ports and for cooperating therewith to supply a fuel and air mixture to the combustion chamber under control of said pulse valve.

2. In a jet apparatus having a combustion chamber, a free acting vibratory valve opening into said chamber, means defining a venturi throat discharging to said vibratory valve, means for introducing fuel into said throat, said throat having an air inlet to supply air to the fuel for feeding a fuel and air mixture to the valve, said valve in its free unstressed condition being partially open to minimize restriction of flow from the throat to the combustion chamber, a housing overlying the air inlet of said throat and having a discharge opening registering with said air inlet, said housing having a plurality of ported walls with the ports arranged circumferentially around a solid central wall portion, a spring metal petal valve on the inner face of each ported wall having a central portion secured to the solid central portion of the wall and a plurality of radially extending resilient fingers overlying the ports to control air flow into the housing and to stop reverse flow of gases out of the housing.

3. In a pulse jet engine having a combustion chamber, means defining a venturi throat having an inlet at one end and a discharge at the opposite end thereof, and a pulsating valve between said discharge end of the venturi throat and the combustion chamber directing air and fuel to the combustion chamber, the improvement which comprises an air inlet housing overlying said throat at the inlet end thereof and connected to the means defining said throat, said housing having a plurality of port openings formed therein to supply the throat inlet with sufficient air to support combustion in the combustion chamber, and resilient flapper valves interiorly of said housing and mounted thereby overlying the port openings to freely admit air to the housing whenever the pulsating valve of the engine admits air to the combustion chamber, but moving outwardly to essentially entirely close the port openings and thereby stopping said flow of air whenever pressure in the housing is above ambient pressure.

4. A pulse jet apparatus, comprising means defining a fuel and air mixing compartment, said compartment having an air inlet opening, a combustion chamber communicating with said fuel and air mixing compartment, a free acting vibratory valve opening into said chamber, a housing having walls defining an enclosure, one of said walls having an opening adapted to register with the air inlet opening of the compartment, a plurality of other walls of said housing each having a ring of keyhole-shaped ports, a plurality of resilient valve members in said housing each having a central disc portion secured to a ported wall centrally of the ring of ports therein and having integral radially extending petals overlying said ports for controlling flow therethrough, said valves being positioned on the inner faces of the ported walls to accommodate free flow of air into the housing when pressure in the housing is less than ambient pressure and stopping reverse flow of air out of the housing to provide a closed chamber for minimizing fire hazards and for muffling noise of the jet apparatus.

References Cited in the file of this patent

UNITED STATES PATENTS

| | | |
|---|---|---|
| 2,546,965 | Bodine | Apr. 3, 1951 |
| 2,612,722 | Tenney | Oct. 7, 1952 |
| 2,629,983 | Anderson | Mar. 3, 1953 |
| 2,657,708 | Kamm et al. | Nov. 3, 1953 |
| 2,722,180 | McIlvaine | Nov. 1, 1955 |
| 2,850,872 | Stockbarger et al. | Sept. 9, 1958 |
| 2,860,484 | Schmidt | Nov. 18, 1958 |